United States Patent [19]

Sung

[11] Patent Number: 6,166,794
[45] Date of Patent: *Dec. 26, 2000

[54] LIQUID CRYSTAL DEVICE INCLUDING GATE INSULATING FILM AND LAYER INSULATING FILM HAVING DIFFERENT DIELECTRIC CONSTANTS

[75] Inventor: Chae Gee Sung, Miyagi-ken, Japan

[73] Assignee: Alps Electric Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/897,243

[22] Filed: Jul. 18, 1997

[30] Foreign Application Priority Data

Jul. 31, 1996 [JP] Japan ..................................... 8-202635

[51] Int. Cl.$^7$ ..................................................... G02F 1/136
[52] U.S. Cl. ............................................. 349/138; 349/43
[58] Field of Search .................................. 349/43, 46, 47, 349/138; 257/59, 72, 410, 411, 759, 752; 438/623, 626, 631, 780

[56] References Cited

U.S. PATENT DOCUMENTS

| | | | |
|---|---|---|---|
| 4,770,498 | 9/1988 | Aoki et al. ................................. | 257/72 |
| 5,097,297 | 3/1992 | Nakazawa ................................. | 257/72 |
| 5,705,829 | 1/1998 | Miyanaga et al. ........................ | 257/72 |
| 5,784,132 | 7/1998 | Hashimoto ................................ | 349/44 |

FOREIGN PATENT DOCUMENTS 4-163528    6/1992    Japan .

OTHER PUBLICATIONS

Sakamoto et al, "A high aperture ratio 3 in. Diagonal VGA a–Si Light Valve with Pixel/Data and Pixel/Gate Lines Overlapping", 1996 SID Digest, May 1996.
Standard Hand Book for electrical engineers, Fink & Carrol, McGraw–Hill, pp. 4–160 to 4–184.

*Primary Examiner*—Kenneth Parker
*Attorney, Agent, or Firm*—Brinks Hofer Gilson & Lione

[57] ABSTRACT

A liquid crystal display device comprises a first substrate, a second substrate disposed opposite to the first substrate, a liquid crystal sealed in a space between the first and the second substrate, gate lines formed in longitudinal rows on the first. substrate, layer insulating film formed over the gate lines, source lines formed in transverse lines on the layer insulating film so as to form a matrix with the gate lines, thin-film transistors each electrically connected to the gate line and the source line, pixel electrodes formed in regions demarcated by the intersecting gate lines and the source lines and connected to the thin-film transistors, respectively, and gate insulating film interposed between the gate electrodes of the thin-film transistors and an active semiconductor layer. The dielectric constant of the gate insulating film being greater than that of the layer insulating film, and the liquid crystal display has a small parasitic capacitance which increases delay in signal transmission.

2 Claims, 8 Drawing Sheets

LIQUID CRYSTAL DEVICE INCLUDING GATE INSULATING FILM AND LAYER INSULATING FILM HAVING DIFFERENT DIELECTRIC CONSTANTS

BACKGROUND OF THE INVENTION

The present invention relates to a liquid crystal display device provided with a gate insulating film and a layer insulating film which are formed of insulating materials respectively having different dielectric constants.

Figure 8:
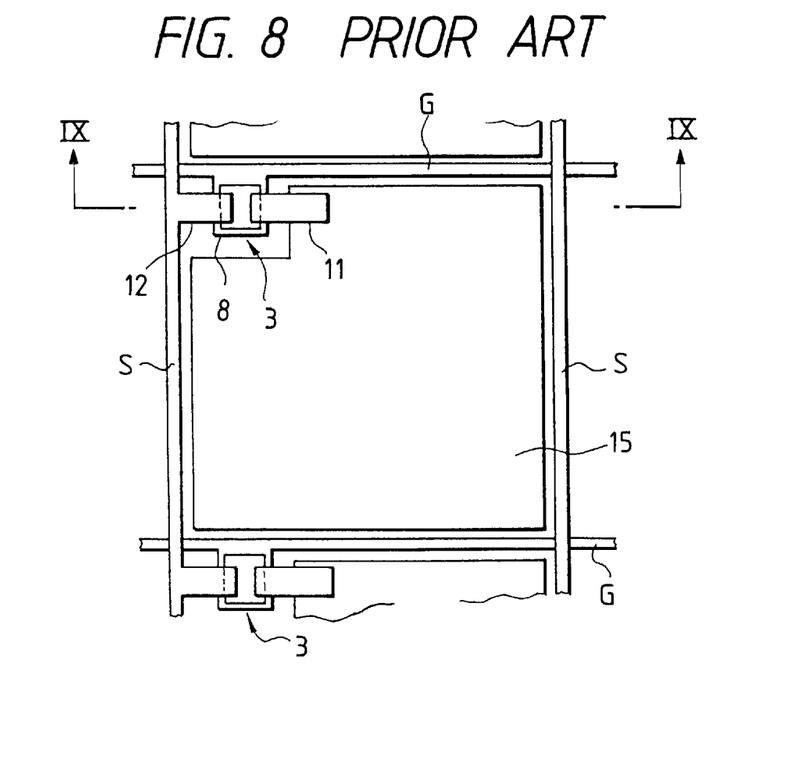
FIG. 8 is plan view of a conventional thin-film transistor array structure.
Figure 9:
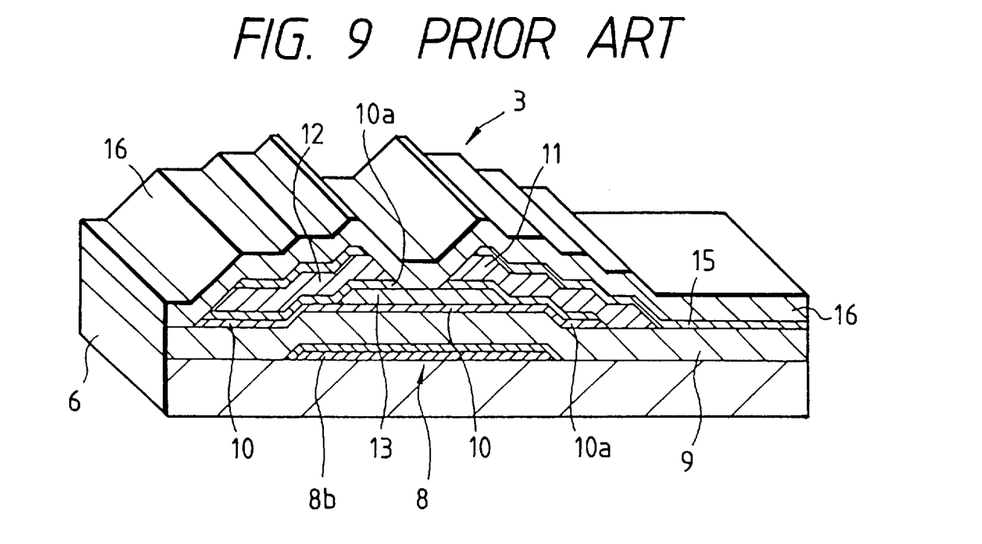
FIG. 9 is a typical sectional view taken on line IX—IX in FIG. 8.

FIGS. 8 and 9 show a thin-film transistor array structure having gate lines G and source lines S formed on a substrate, and intended for use on an active matrix liquid crystal display. In the thin-film transistor array structure shown in FIGS. 8 and 9, gate lines G and source lines S are formed in a matrix on a transparent substrate 6, such as a glass substrate. A thin-film transistor 3 is formed near each intersection point of the gate line G and the source line S.

The thin-film transistor 3 shown in FIGS. 8 and 9 is of a generally known etch stopper type bottom gate construction. A gate insulating film 9 is formed over the gate lines G and gate electrodes 8 extending from the gate lines G, a semiconductor film 10, such as anamorphous silicon film (a-Si film), is formed on the gate insulating film 9, drainelectrodes 11 of a conductive material is formed on the semiconductor film 10, and source electrodes 12 of a conductive material are formed on the semiconductor film 10 opposite to the drain electrodes 11, respectively. An ohmic contact film 10a of amorphous silicon heavily doped with an impurity, such as phosphorus, is formed over the semiconductor film 10, and an etching stopper 13 is formed on the ohmic contact film 10a so as to extend between the drain electrode 11 and the source electrode 12. A transparent pixel electrode 15 of a transparent electrode material is formed so as to extend over the drain electrode 11 toward a side of the drain electrode 11.

A passivation film 16 is formed so as to cover the gate insulating film 9, the source electrodes 12 and the transparent pixel electrodes 15. An alignment layer, not shown, is formed on the passivation film 16, and a liquid crystal is placed over the alignment layer to form an active matrix liquid crystal display device. An electric field is applied to the molecules of the liquid crystal by the transparent pixel electrode 15 to control the alignment of the molecules of the liquid crystal.

Figure 10:
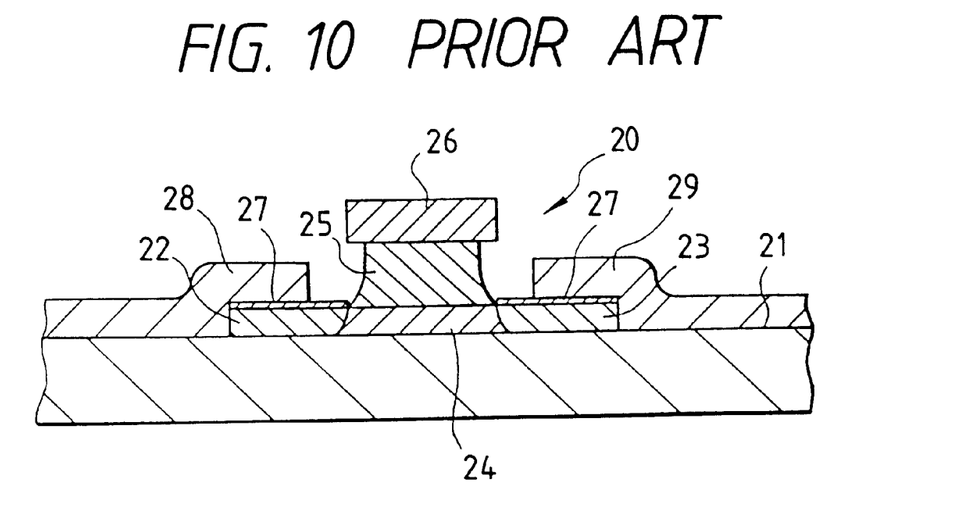
FIG. 10 is a typical sectional view of a conventional thin-film transistor of a top gate construction.

A thin-film transistor 20 of what is called a top gate construction shown in FIG. 10 employed in another known liquid crystal display device has semiconductor films 22 and 23, an active semiconductor layer 24 formed between the semiconductor films 22 and 23, an insulating film 25 formed on the active semiconductor layer 24, a gate electrode 26 formed on the insulating film 25, a silicide layer 27 formed on the semiconductor films 22 and 23, a source electrode 28 formed on a portion of the silicide layer 27 corresponding to the semiconductor film 22, and a drain 29 formed on a portion of the silicide layer 27 corresponding to the semiconductor film 23.

In the thin-film transistor 3 shown in FIGS. 8 and 9 (the thin-film transistor 20 shown in FIG. 10), a channel region is formed in the semiconductor film 10 (the active semiconductor layer 24) by applying a voltage to the gate electrode 8 (the gate electrode 26) to enable carriers to move through the channel. Thus, current that flows across the source electrode and the drain electrode is controlled by applying a voltage to the gate electrode 8 (the gate electrode 26).

A parasitic capacitance is created unavoidably in the thin-film transistor array structure shown in FIG. 9. The parasitic capacitance is created necessarily because the gate lines G and the source lines S are formed in a matrix on the substrate with the insulating film interposed between the gate lines G and the source lines S. Such parasitic capacitance of a driving circuit for driving the liquid crystal is liable to cause a delay in signal transmission.

In the thin-film transistors shown in FIGS. 8 and 9, and in FIG. 10, it is important that an electric field created by the gate electrode acts efficiently on the channel region for a transistor action. However, there has not been any thin-film transistor of a construction capable of avoiding the creation of parasitic capacitance and of improving the efficiency of transistor action.

SUMMARY OF THE INVENTION

The present invention has been made in view of the foregoing problems and it is therefore an object of the present invention to provide a liquid crystal display device comprising thin-film transistors of improved characteristics, each provided with a layer insulating film formed of a material having a small dielectric constant to reduce delay in signal transmission by reducing parasitic capacitance, and a gate insulating film formed of a material having a dielectric constant greater than that of the material forming the layer insulating film in a thickness less than that of the gate insulating film of the conventional thin-film transistor so that an electric field created by the gate electrode can efficiently be applied to a semiconductor part.

With the foregoing object in view, the present invention provides a liquid crystal display device comprising: a pair of substrates; a liquid crystal sealed in a space between the pair of substrates; gate lines formed on one of the substrate; source lines formed on the same substrate so as to form a matrix together with the gate lines; a layer insulating film formed between the gate lines and the source lines; thin-film transistors electrically connected to the gate lines and the source lines, respectively; and pixel electrodes formed in regions demarcated by the gate lines and the source lines and connected to the thin-film transistors, respectively. In this liquid crystal display device, each thin-film transistor is provided with a gate electrode, an active semiconductor layer, and a gate insulating film interposed between the gate electrode and the active semiconductor layer and having a dielectric constant greater than that of the layer insulating film.

In this liquid crystal display device, each thin-film transistor may comprise a gate electrode connected to the gate line, an active semiconductor layer formed opposite to the gate electrode with the gate insulating film formed between the gate electrode and the active semiconductor layer, a source electrode formed on one side of the gate electrode, and a drain electrode formed on the other side of the gate electrode, and the drain electrode may be connected to the pixel electrode.

In this thin-film transistor, the gate insulating film may be thinner than that of the conventional thin-film transistor, so that the effect of an electric field created by the gate electrode on the active semiconductor layer can be enhanced, which improves the characteristics of the thin-film transistor. If the dielectric constant of the layer insulating film is smaller than that of the layer insulating film of the conventional thin-film transistor, parasitic capacitance created by the formation of the insulating film between the gate lines and the source lines can be reduced.

Preferably, the dielectric constant of the gate insulating film is six or above, and that of the layer insulating film is four or below. If the gate insulating film and the layer insulating film have such dielectric constants, respectively, the characteristics of the thin-film transistor are improved greatly and the parasitic capacitance of the thin-film transistor structure can markedly be reduced.

Preferably, the gate insulating film contains, as a principal component, at least one of silicon dioxide, silicon nitride, tantalum oxide and aluminum oxide.

Preferably, the layer insulating film contains, as a principal component, at least either silicon oxide fluoride or a polyimide resin.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
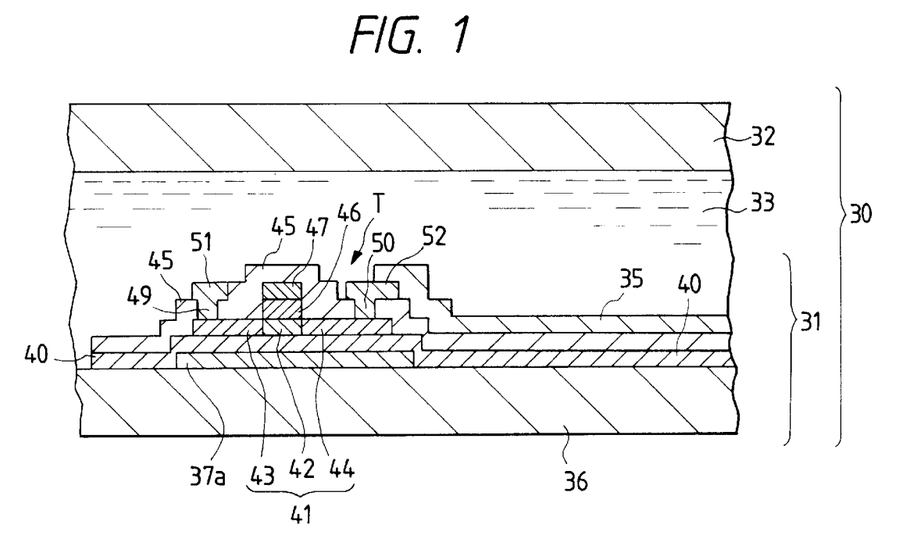
FIG. 1 is typical sectional view of a liquid crystal display device in a preferred embodiment according to the present invention.
Figure 2:
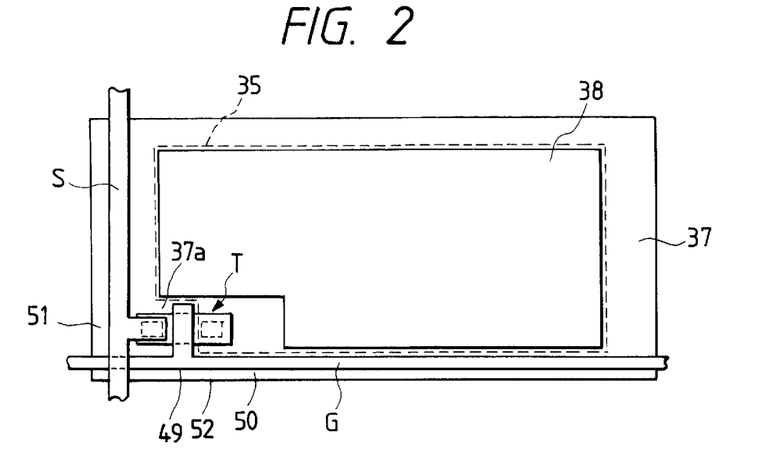
FIG. 2 is a typical plan view of an essential portion of the liquid crystal display device of FIG. 1.

Referring to FIGS. 1 and 2, a liquid crystal display device 30 in a preferred embodiment according to the present invention comprises a thin-film transistor array structure 31, a transparent counter plate 32 disposed opposite to and spaced from the thin-film transistor array structure 31, and a liquid crystal 33 sealed in a space between the thin-film transistor array structure 31 and the counterplate 32.

The thin-film transistor array structure 31, similarly to the conventional thin-film transistor array structure shown in FIG. 8, is provided with a plurality of source lines S arranged in longitudinal rows and a plurality of gate lines G arranged in transverse lines so as to form a matrix together with the source lines S. A pixel electrode 35 of a transparent conductive material, such as ITO (indium tin oxide), is formed in each of regions demarcated by the source lines S and the gate lines G, and a thin-film transistor T is formed near each pixel electrode 35.

In FIGS. 1 and 2, only one of the regions demarcated by the source lines S and the gate lines G is shown in enlarged views. The plurality of regions like that shown in FIGS. 1 and 2 are formed in lines and rows on the thin-film transistor array structure 31 to form a screen.

When fabricating the thin-film transistor array structure 31, a black mask 37 having openings 38 corresponding to the regions demarcated by the source lines S and the gate lines G is formed on an upper surface of a transparent substrate 36 so as to cover regions for the source lines S, the gate lines G and the thin-film transistors T. The pixel electrodes 35 are formed in regions on the transparent substrate 36 corresponding to the openings 38. An extension 37a for covering the periphery of a region for the thin-film transistor T is formed in a corner of the opening 38 of the black mask 37.

The thin-film transistor T is formed on the extension 37a of the black mask 37 formed near an intersection of the source line S and the gate line G. A lower layer insulating film 40 is formed so as to cover the black mask 37, an island of a semiconductor film 41 is formed on a portion of the lower layer insulating film 40 corresponding to the extension 37a of the black mask 37.

The semiconductor film 41 has a central active semiconductor layer 42, and semiconductor layers 43 and 44 formed on the opposite sides of the active semiconductor layer 42. A gate insulating film 46 and a gate electrode 47 are formed in that order on the active semiconductor layer 42. An upper layer insulating film 45 is formed so as to cover the gate electrode 47 and the gate insulating film 46, contact holes 49 and 50 are formed in portions of the upper layer insulating film 45 corresponding to the semiconductor layers 43 and 44. A source electrode 51 is connected through the contact hole 49 to the semiconductor layer 43, and a drain electrode 52 is connected through the contact hole 50 to the semiconductor layer 44. Although not shown in FIG. 1, the upper surfaces of the semiconductor layers 43 and 44 are coated with a silicide layer to secure satisfactory contact between the semiconductor layers 43 and 44 and a conductive material filling up the contact holes 49 and 50.

The upper layer insulating film 45 is formed of an insulating material having a dielectric constant of four or below, such as SiOF (silicon oxide fluoride), a polyimide resin or $SiO_2$ (silicon dioxide). The gate insulating film 46 is formed of an insulating material having a dielectric constant of six or above, such as a-$SiN_x$ (amorphous silicon nitride), $TaO_x$ (tantalum oxide) or $AlO_x$ (aluminum oxide). Although the dielectric constant of $SiO_2$ is four, $SiO_2$ can be used in combination with a material having a dielectric constant lower than that of $SiO_2$ for forming the layer insulating film. The insulating materials mentioned above may contain a desired additive.

The semiconductor layers 43 and 44 are n⁺-type layers formed by doping a-Si films by an ion doping process. The silicide layer is a layer of a compound of Si, and Mo (molybdenum), Ta (tantalum) or W (tungsten).

If the layer insulating films 40 and 45 are formed of SiOF having a dielectric constant of three or below, a polyimide resin having a dielectric constant of three or below, or a polyimide resin containing an additive and having a dielectric constant of three or below, the thickness of the same may be 1400 Å or below. The layer insulating films 40 and 45 can be formed by a spin coating process or an evaporation process. If the gate insulating film 46 is formed of $SiO_2$ (dielectric constant=4), a-$SiN_x$ (dielectric constant=7), $TaO_x$ (dielectric constant=23) or $AlO_x$ (dielectric constant=8 to 10), the thickness of the same may be 1000 Å or below. The gate insulating film 46 can be formed by a CVD process or a sputtering process including oxidation.

Preferably, the gate insulating film 46 is formed of a material having a large dielectric constant, such as a-$SiN_x$, $TaO_x$ or $AlO_x$. However, the gate insulating film 46 may be formed of $SiO_2$ having a dielectric constant of four if $SiO_2$ is used in combination with a material having a dielectric constant greater than six. $Sio_2$ having a dielectric constant of four can be used in combination with a material having a dielectric constant of 3 or below for forming the layer insulating films 40 and 45.

The source electrode 51 is connected to the source line S formed on the upper layer insulating film 45, the gate electrode 47 is connected to the gate line G underlying the upper layer insulating film 45. The source line S and the gate line G are isolated from each other by the upper layer insulating film 45. The drain electrode 52 is connected to the pixel electrode 35.

A method of fabricating the thin-film transistor array structure 31 will be described by way of example with reference to FIGS. 3 to 7.

Figure 3A:
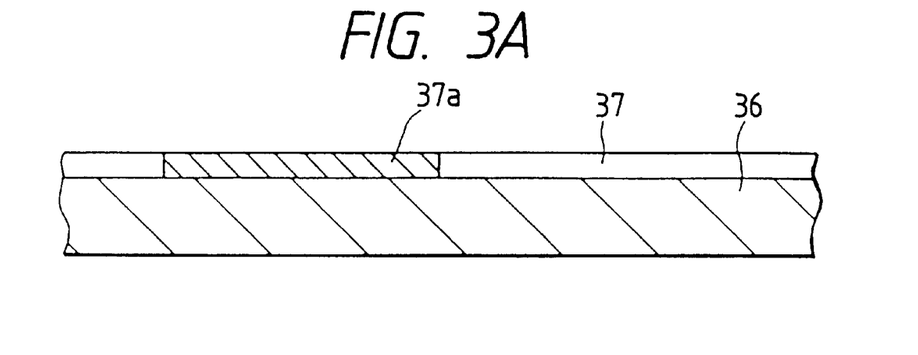
FIG. 3A is a typical cross-sectional view of the liquid crystal display device of FIG. 1 during sequential processing steps, illustrating a substrate and a black mask formed on the substrate.
Figure 4A:
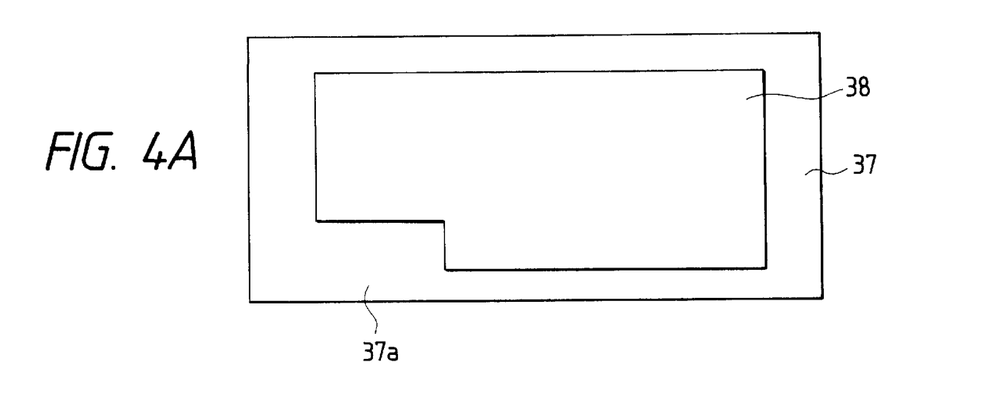
FIGS. 4A, 4B and 4C are typical plan views of the liquid crystal display device of FIG. 1, respectively corresponding to FIGS. 3A, 3B and 3C.

First, the black mask 37 is formed on the transparent substrate 36. The black mask 37 is formed by forming a black mask forming film of a material for forming the black mask 37 over the entire upper surface of the substrate 36, coating the black mask forming filmwith aresist film, patterning the resist film by a photolithographic etching process, and etching the black mask forming film, using the patterned resist film as a mask to form the black mask 37 having the openings 38 arranged at equal intervals in lines and rows, and the extensions 37a as shown in FIGS. 3A and 4A.

Figure 3B:
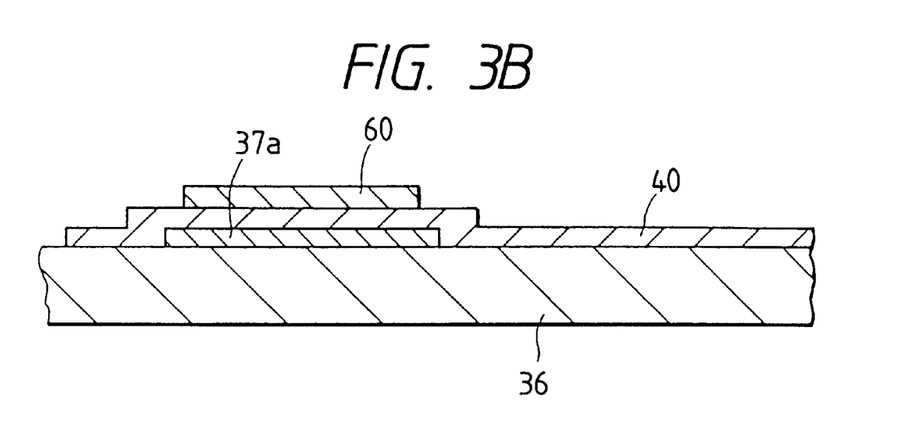
FIG. 3B is a typical cross-sectional view of the liquid crystal display device of FIG. 1 during sequential processing steps, illustrating the substrate on which the black mask, a layer insulating film and a preparatory semiconductor layer are formed.
Figure 4B:
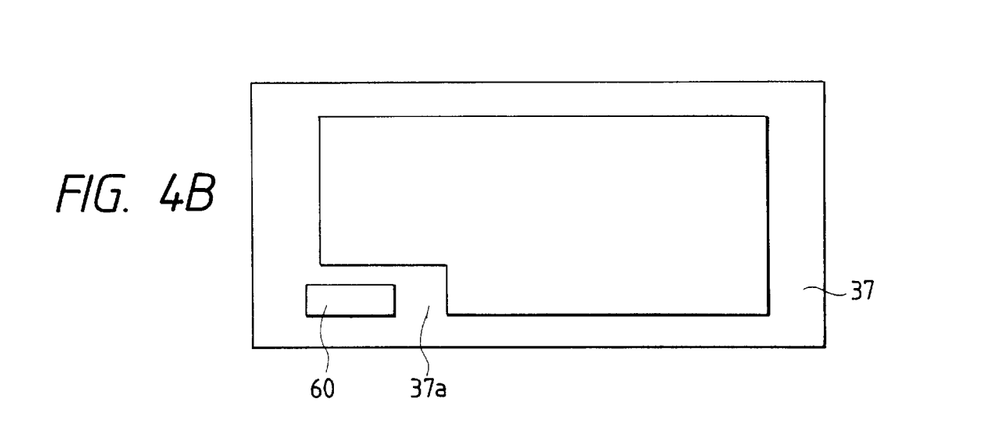

Then, the lower layer insulating film 40 is formed over the black mask 37, and islands of a preparatory semiconductor film 60 of a-Si or the like are formed on portions of the lower layer insulating film 40 corresponding to the extensions 37a as shown in FIGS. 3B and 4B.

Figure 3C:
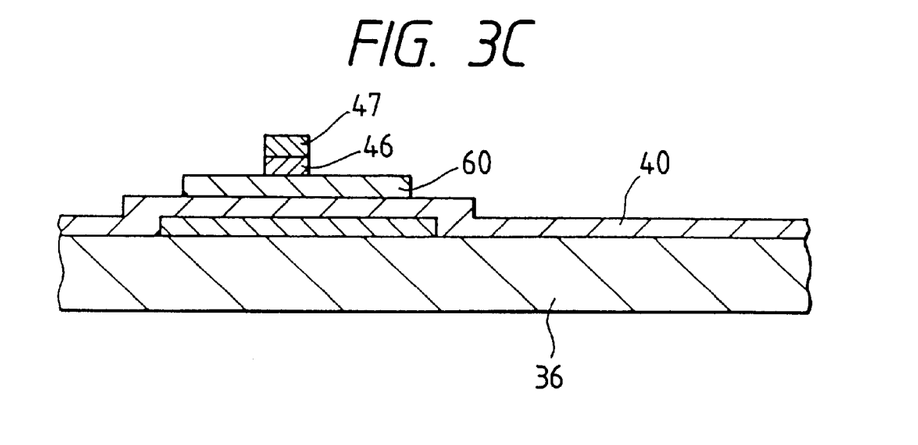
FIG. 3C is typical cross-sectional view of the liquid crystal display device of FIG. 1 during sequential processing steps, illustrating the substrate on which the black mask, the layer insulating film, the preparatory semiconductor layer, a gate insulating film and a gate electrode are formed.
Figure 4C:
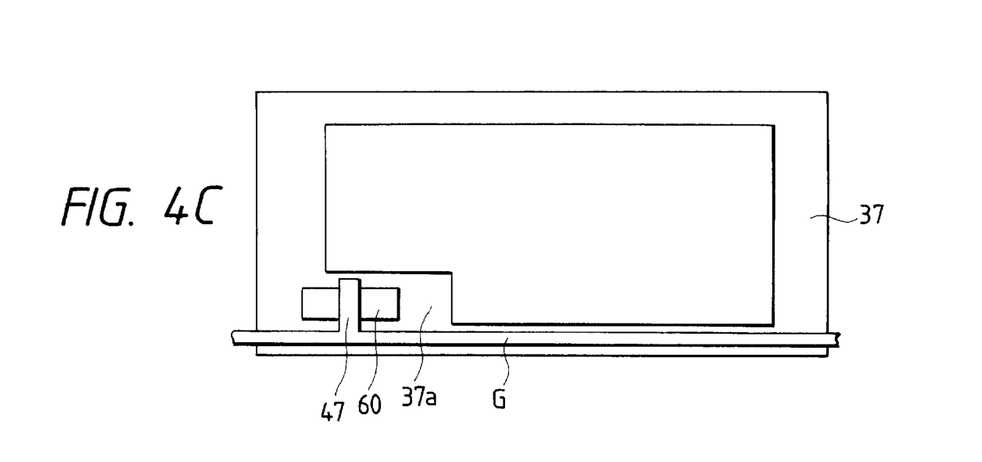

Then, as shown in FIGS. 3C and 4C, the gate insulating film 46 are formed on the lower layer insulating film 40, the gate lines G are formed on the gate insulating film 46 by a photolithographic etching process, and the gate electrodes 47 are formed on portions of the gate insulating film 46 extending from the gate lines G on the preparatory semiconductor film 60 by a photolithographic etching process.

Figure 5A:
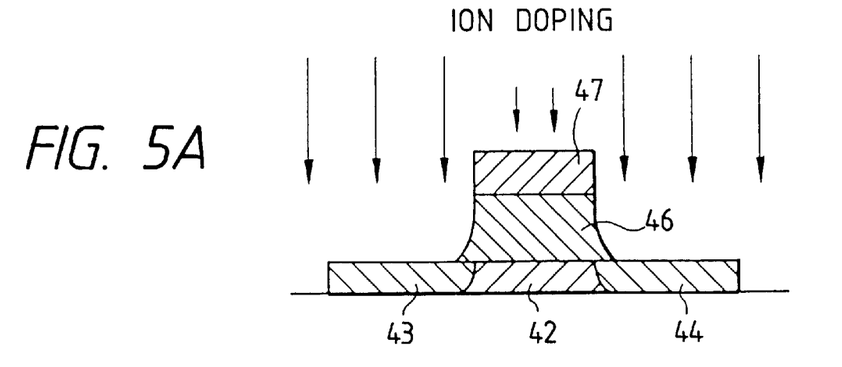
FIGS. 5A, 5B and 5C are typical cross-sectional views of the liquid crystal display device of FIG. 1 during sequential processing steps, illustrating a process of ion-doping the preparatory semiconductor layer, a silicide layer formed on a semiconductor region, and a portion where the semiconductor region and an active semiconductor layer are joined, respectively.
Figure 5B:
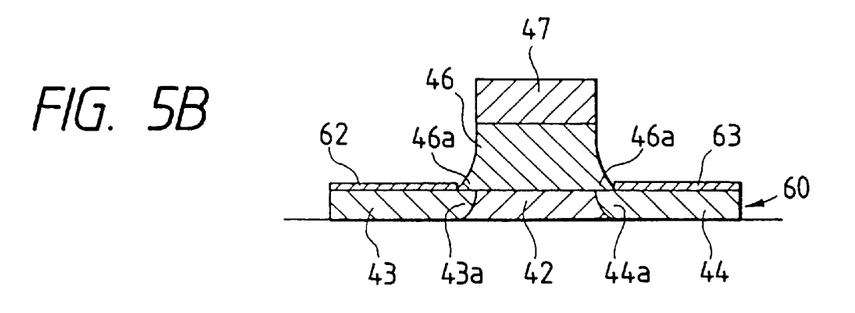
Figure 5C:
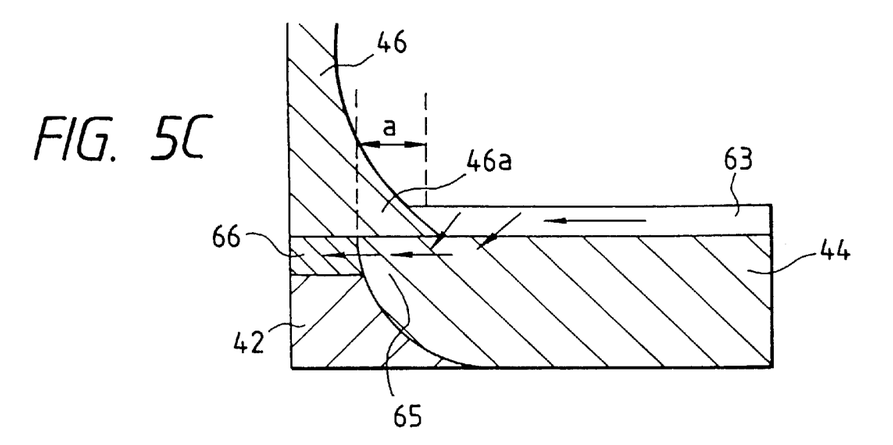

Subsequently, a workpiece obtained by the foregoing processes is subjected to an ion doping process. Ions of P (phosphorus), B (boron) or As (arsenic) are implanted in the semiconductor portions 43 and 44 of the preparatory semiconductor film 60 by an ion gun using the gate electrodes 47 and the gate insulating film 46 as a mask as shown in FIG. 5A. As shown in FIG. 5C, the ions are implanted in a high concentration in the semiconductor layers 43 and 44 of the preparatory semiconductor film 60 of a-Si not coated with the gate insulating film 46, so that the n⁺-type semiconductor layers 43 and 44 are formed. Ions are not implanted in portions of the preparatory semiconductor film 60 coated with the gate insulating film 46. However, the peripheral portions 46a of the roots of the lands of the gate insulating film 46 are thin and are not covered with the gate electrodes 47, the ions emitted by the ion gun penetrate the peripheral portions 46a of the roots of the lands of the gate insulating film 46 and are implanted into portions of the preparatory semiconductor film 60 corresponding to the peripheral portions 46a, so that n⁺-type extensions 43a and 44a are formed in portions of the preparatory semiconductor film 60 under the peripheral portions 46a of the roots of the lands of the gate insulating film 46, and the active semiconductor layer 42 formed between the extensions 43a and 44a serves as a channel region 66 for electrons.

Then, a thin film of Mo, Ta or W is formed on the upper surfaces of the semiconductor layers 43 and 44, the workpiece is subjected to a heat treatment to make an element forming the thin film diffuse into the semiconductor layers 43 and 44, and to make an element forming the semiconductor layers 43 and 44 diffuse into the thin film. If necessary, an upper portion of the thin film may be removed by etching or the like to form silicide layers 62 and 63 on the upper surfaces of the semiconductor layers 43 and 44, respectively, as shown in FIG. 5B.

Figure 6A:
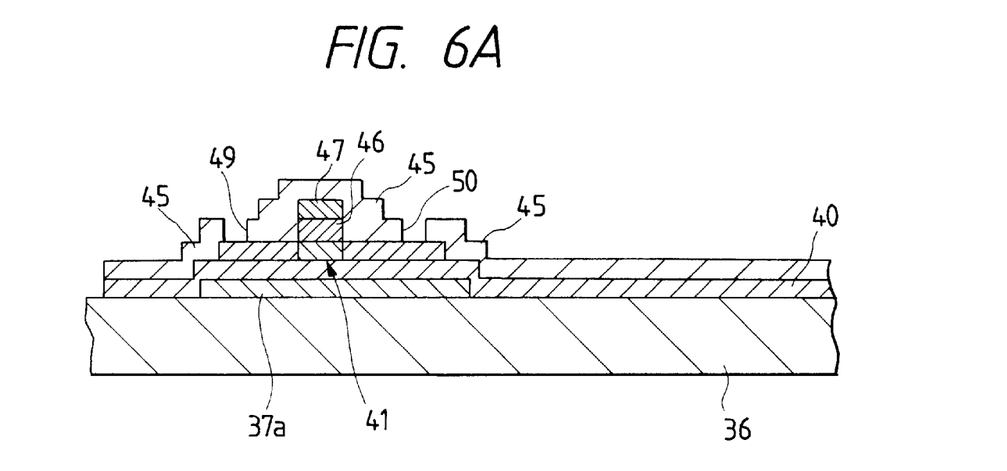
FIGS. 6A and 6B are typical sectional views of the liquid crystal display device of FIG. 1 during sequential processing steps, illustrating the substrate, the semiconductor film, the gate insulating film, the gate electrode, the layer insulating film and contact holes, and a source electrode and a drain electrode, respectively.
Figure 7A:
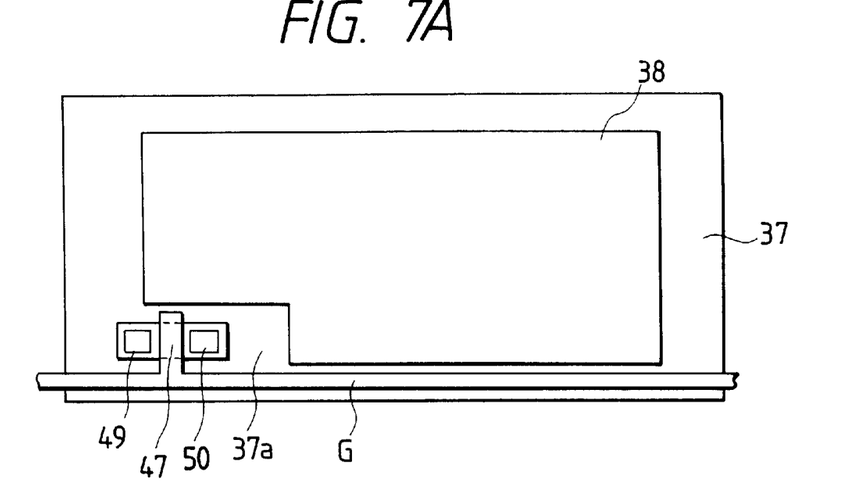
FIGS. 7A and 7B are plan views respectively corresponding to FIGS. 6A and 6B.

Then, as shown in FIGS. 6A and 7A, the upper layer insulating film 45 is formed so as to cover the lower layer insulating film 40, the semiconductor layer 41, the gate insulating film 46 and the gate electrodes 47, and the contact holes 49 and 50 are formed in portions of the upper layer insulating film 45 corresponding to the semiconductor layers 43 and 44.

Figure 6B:
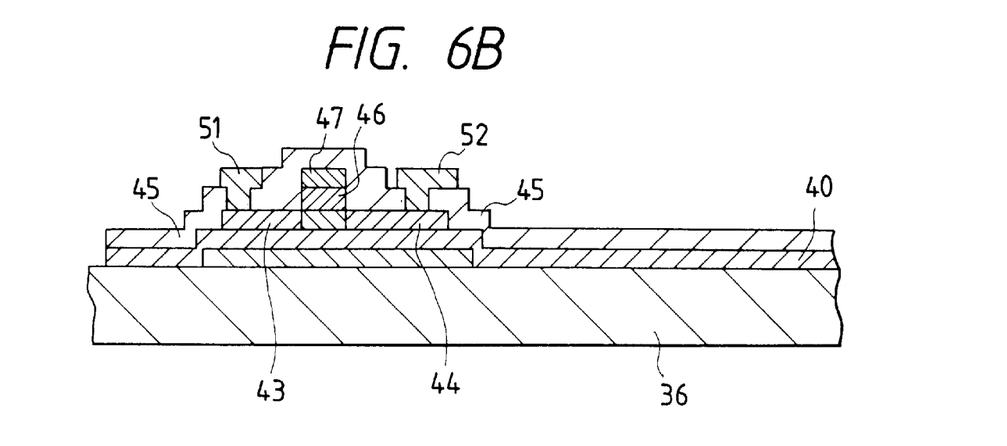
Figure 7B:
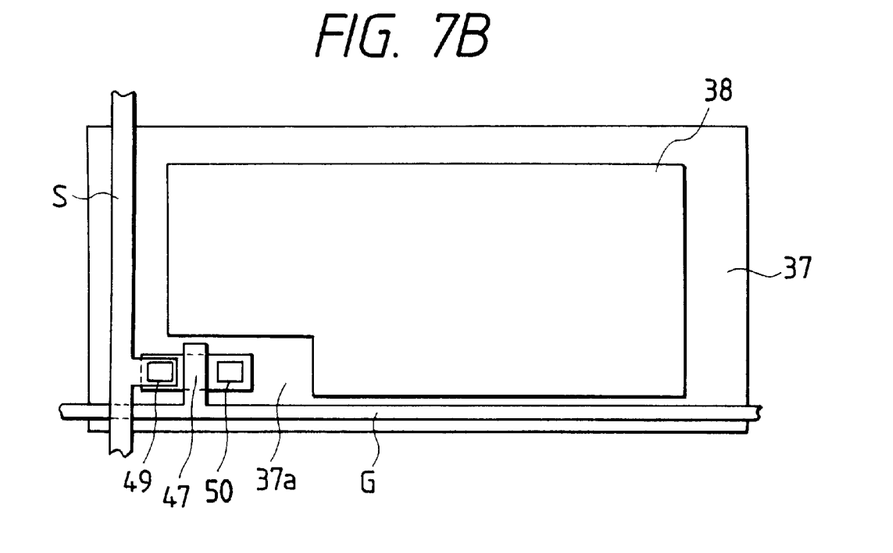

Then, as shown in FIGS. 6B and 7B, the source electrodes 51 are formed so as to be connected through the contact holes 49 to the semiconductor layers 43, and the drain electrodes 52 are formed so as to be connected through the contact holes 50 to the semiconductor layers 44. Then, the source lines S are formed on the upper layer insulating film 45, and the pixel electrodes 35 are formed in the openings 37a of the black mask 37 to complete the thin-film transistor array structure 31 shown in FIGS. 1 and 2.

In the thin-film transistor array structure 31, the intensity of a current which flows through the channel region 66 between the source electrode 51 and the drain electrode 52 by an electric field created by the gate electrode 47, so that a transistor action can be achieved.

Since the dielectric constant of the gate insulating film 46 is six or above, the gate insulating film 46 may be relatively thin. Therefore, the gate electrode 47 and the channel region 66 can be formed close to each other and hence the electric field created by the gate electrode 47 can efficiently be applied to the channel region 66. Accordingly, the characteristics of the thin-film transistor T are improved and, since the gate insulating film 46 may be relatively thin, the degree of freedom of design of the thin-film transistor T is increased.

In the conventional thin-film transistor array structure, although the thin-film transistors have satisfactory characteristics, an increased parasitic capacitance is created if both the gate insulating film and the layer insulating film are formed of materials having a large dielectric constant. Although the parasitic capacitance can be reduced, the thin-film transistors have unsatisfactory characteristics if both the gate insulating film and the layer insulating film are formed of materials having a small dielectric constant.

Since the dielectric constants of the layer insulating films 40 and 45 are four or below, which are smaller than that of the gate insulating film 46, the parasitic capacitance mainly attributable to the formation of the upper layer insulating film 45 between the source lines S and the gate lines G can be reduced, so that delay in signal transmission due to the parasitic capacitance can be reduced.

When carriers move through the semiconductor active layer 24 serving as a channel region of the conventional thin-film transistor 20 of FIG. 10, holes move through the edges of the semiconductor layer 23 and the thin peripheral portions of the insulating film 25 and a leakage current flows because the silicide layer 27 and the channel region are very close to each other and the edges of the semiconductor layer 23 and the thin peripheral portions of the insulating film 25 lie between the silicide layers 27 and the channel region and, consequently, a current is liable to leak while the thin-film transistor 20 is in an off state.

In the thin-film transistor T employed in the liquid crystal display device of the present invention, the extension 65, i.e., an n$^+$-type layer, is formed between the silicide layer 63 and the active semiconductor layer 42 as shown in an enlarged view in FIG. 5C. Therefore, the movement of holes is blocked by the extension 65, electrons are able to move easily from the silicide layer 63 through the extension 65 into the channel region 66 and the flow of electrons is scarcely affected by holes. Accordingly, current leakage is suppressed, the off-state current $I_{OFF}$ is reduced and the reliability of the thin-film transistor T is improved.

The gate insulating film and the layer insulating film can easily and separately be formed because the gate electrode is formed in the gate insulating film formed on the middle semiconductor region of the semiconductor layer having the middle semiconductor region and the semiconductor regions on the opposite sides of the middle semiconductor region, the semiconductor regions are connected to the source electrode and the drain electrode, respectively, and those layers are insulated by the layer insulating film. Accordingly, the gate insulating film and the layer insulating film differing in dielectric constant from each other can be formed. Thus, the liquid crystal display device is provided with the thin-film transistors having excellent characteristics, has a small parasitic capacitance and is capable of operating with a short delay in signal transmission.

Although the invention has been described in its preferred form with a certain degree of particularity, obviously many changes and variations are possible therein. It is therefore to be understood that the present invention may be practiced otherwise than as specifically described herein without departing from the scope and spirit of the invention.

What is claimed is:

1. A liquid crystal display device comprising:

a first substrate;

a second substrate disposed opposite to the first substrate;

a liquid crystal sealed in a space between the first and the second substrate;

gate lines formed in longitudinal rows on the first substrate;

a layer insulating film formed over the gate lines and comprising silicon dioxide having a dielectric constant of not more than 3;

source lines formed in transverse lines on the layer insulating film to form a matrix with the gate lines;

thin-film transistors each electrically connected to the gate line and the source line;

pixel electrodes formed in regions demarcated by the intersecting gate lines and the source lines and connected to the thin-film transistors, respectively; and gate insulating films interposed between active semiconductor layers and gate electrodes integrally formed with the gate lines of the thin-film transistors, the gate insulating films comprising tantalum oxide having a dielectric constant of at least 23;

wherein formation of a parasitic capacitance between the source lines and the gate lines is suppressed by the dielectric constant of the layer insulating film disposed between the gate lines and the source lines at intersections of the gate lines and source lines being lower than the dielectric constant of the gate insulating films, thereby suppressing signal delay in the gate lines caused by the parasitic capacitance.

2. A liquid crystal display device comprising:

a first substrate;

a second substrate disposed opposite to the first substrate;

a liquid crystal sealed in a space between the first and the second substrate;

gate lines formed in longitudinal rows on the first substrate;

a layer insulating film formed over the gate lines and comprising silicon dioxide having a dielectric constant of not more than 3;

source lines formed in transverse lines on the layer insulating film to form a matrix with the gate lines;

thin-film transistors each electrically connected to the gate line and the source line;

pixel electrodes formed in regions demarcated by the intersecting gate lines and the source lines and connected to the thin-film transistors, respectively; and gate insulating films interposed between active semiconductor layers and gate electrodes integrally formed with the gate lines of the thin-film transistors, the gate insulating films comprising aluminum oxide having a dielectric constant of 8–10;

wherein formation of a parasitic capacitance between the source lines and the gate lines is suppressed by the dielectric constant of the layer insulating film disposed between the gate lines and the source lines at intersections of the gate lines and source lines being lower than the dielectric constant of the gate insulating films, thereby suppressing signal delay in the gate lines caused by the parasitic capacitance.

* * * * *